US012135135B2

(12) United States Patent
D'Amore et al.

(10) Patent No.: US 12,135,135 B2
(45) Date of Patent: *Nov. 5, 2024

(54) UV LAMP AND ANTI-SCALE WATER TREATMENT WATER HEATER APPARATUS WITH SANITATION LOOP WITH TRANSPARENT WALL

(71) Applicant: Watts Regulator Co., North Andover, MA (US)

(72) Inventors: Theresa D'Amore, Cornwall-On-Hudson, NY (US); Vincent D'Amore, Salisbury Mills, NY (US); Brent A. Beukema, Grand Rapids, MI (US); Gordon J. Stannis, Saugatuck, MI (US)

(73) Assignee: Watts Regulator Co., North Andover, MA (US)

( * ) Notice: Subject to any disclaimer, the term of this patent is extended or adjusted under 35 U.S.C. 154(b) by 488 days.

This patent is subject to a terminal disclaimer.

(21) Appl. No.: 17/644,477

(22) Filed: Dec. 15, 2021

(65) Prior Publication Data

US 2022/0107093 A1 Apr. 7, 2022

Related U.S. Application Data

(63) Continuation of application No. 16/595,781, filed on Oct. 8, 2019, now Pat. No. 11,397,009, which is a
(Continued)

(51) Int. Cl.
*F24D 17/00* (2022.01)
*C02F 1/32* (2023.01)
(Continued)

(52) U.S. Cl.
CPC .......... *F24D 17/0073* (2013.01); *C02F 1/325* (2013.01); *F24D 19/1051* (2013.01); *C02F 5/08* (2013.01)

(58) Field of Classification Search
CPC .. C02F 1/001; C02F 1/02; C02F 1/325; C02F 1/76; C02F 1/32; C02F 1/42; C02F 5/08;
(Continued)

(56) References Cited

U.S. PATENT DOCUMENTS 5,236,600 A 8/1993 Hutchins
6,453,938 B1 9/2002 Ebster
(Continued)

FOREIGN PATENT DOCUMENTS

AU 2010203312 A1 * 2/2011 ................ C02F 1/02
DE 102004049316 A1 * 4/2006 ................ C02F 1/02
(Continued)

OTHER PUBLICATIONS

DE-102004049316-A1 English description, Apr. 2006, Grimm R.*
(Continued)

*Primary Examiner* — Akash K Varma
(74) *Attorney, Agent, or Firm* — Harris Beach PLLC

(57) ABSTRACT

A water heating and treatment system includes a water heater, a hot water outflow line from the water heater, and a cold water supply line to supply water to the water heater. The cold water supply line includes at least one of an anti-scale device, and a UV sanitation lamp. A mixing station supplies a temperature regulated heated water to one or multiple temperature zones. The water heater, the anti-scale device, the UV sanitation lamp, and the mixing station are contained in a single enclosure having at least one transparent wall through which components can be viewed. A method for treating hot water to suppress pathogens and undesired bacterial content in a domestic water system is also described.

24 Claims, 3 Drawing Sheets

Related U.S. Application Data continuation-in-part of application No. 16/196,538, filed on Nov. 20, 2018, now Pat. No. 11,396,467.

(51) Int. Cl.
*F24D 19/10* (2006.01)
*C02F 5/08* (2023.01)

(58) Field of Classification Search
CPC .. C02F 9/00; C02F 2209/02; C02F 2201/005; C02F 2301/046; C02F 2303/04; C02F 2303/22; F24D 17/0073; F24D 17/0078; F24D 17/00; F24D 19/0092; F24D 19/1051; F24D 19/00; F24D 19/19; F24D 19/10; F24D 2220/042; F24H 9/0047; F24H 9/00; F24H 9/16; F24H 9/45
USPC .............................................. 210/739, 748.1
See application file for complete search history.

(56) References Cited

U.S. PATENT DOCUMENTS

| | | |
|---|---|---|
| 9,475,717 B2 | 10/2016 | Clark et al. |
| 9,688,560 B2 | 6/2017 | Clark et al. |
| 9,738,547 B2 | 8/2017 | Schmitt et al. |
| 9,879,120 B2 | 1/2018 | Koslow |
| 9,932,245 B2 | 4/2018 | Schmitt et al. |
| 2003/0034292 A1 | 2/2003 | Rela |
| 2003/0034305 A1 | 2/2003 | Luehmann et al. |
| 2009/0101593 A1 | 4/2009 | Dresty et al. |
| 2011/0076190 A1 | 3/2011 | Tanaka et al. |
| 2014/0054222 A1 | 2/2014 | Clark et al. |

FOREIGN PATENT DOCUMENTS

| | | | |
|---|---|---|---|
| DE | 202006016416 U1 | 2/2007 | |
| GB | 2099559 A | * 12/1982 | ......... F24D 17/0073 |
| JP | 2006112719 A | 4/2006 | |

OTHER PUBLICATIONS

European Patent Office, Extended European Search Report for corresponding EP Application No. 19209957.0 dated Jun. 30, 2020 (14 pgs).

Norgaard, J., "Water disinfection in commercial buildings", 2012 GRUNDFOS Holding A/S (32 pgs.).

European Patent Office, Extended European Search Report for corresponding EP Patent Application No. 19210862.9 dated Mar. 3, 2020 (9 pgs).

\* cited by examiner

UV LAMP AND ANTI-SCALE WATER TREATMENT WATER HEATER APPARATUS WITH SANITATION LOOP WITH TRANSPARENT WALL

CROSS-REFERENCE TO RELATED APPLICATIONS

This application is a continuation of, and claims priority to and the benefit of co-pending U.S. patent application Ser. No. 16/595,781, UV LAMP AND ANTI-SCALE WATER TREATMENT WATER HEATER APPARATUS WITH SANITATION LOOP, filed Oct. 8, 2019, and U.S. patent application Ser. No. 16/196,538, UV LAMP AND ANTI-SCALE WATER TREATMENT WATER HEATER APPARATUS WITH SANITATION LOOP, filed Nov. 20, 2018, which applications are incorporated herein by reference in their entirety.

FIELD OF THE APPLICATION

The application relates to sanitization of water and particularly to sanitization of water in a water heater and treatment system.

BACKGROUND

Legionnaires' disease from bacteria vaporized by evaporation from contaminated waters contaminated with *Legionella* germs is a well-known risk. As described, for example, by the Centers for Disease Control and Prevention (CDC), in the June 2016 issue of Vitalsigns™, "*Legionella* grows best in building water systems that are not well maintained. Building owners and managers should adopt newly published standards that promote *Legionella* water management programs, which are ways to reduce the risk of this germ in building water systems".

SUMMARY

A water heating and treatment system includes a water heater, a hot water outflow line from the water heater, and a cold water supply line to supply water to the water heater. The cold water supply line includes at least one of an anti-scale device, and a UV sanitation lamp. A mixing station supplies a temperature regulated heated water to one or multiple temperature zones. The mixing station is fluidly coupled to the cold water supply line and to the hot water outflow line from the water heater, the mixing station to supply heated water to at least a first temperature zone at a first hot water temperature. The water heater, the anti-scale device, the UV sanitation lamp, and the mixing station are contained in a single enclosure having at least one transparent wall through which components can be viewed.

The single enclosure can include two of the transparent walls on opposite sides of the enclosure.

The water heating and treatment system can further include a hot water recirculation line contained in the enclosure. The water heating and treatment system can further include a one-way check valve disposed in the hot water recirculation line.

The hot water recirculation line can include a sediment filter. The hot water recirculation line can include an additional UV lamp sanitation device. The hot water recirculation line can include an additional anti-scale device.

The water heater can include an automatic blow down device including a blow down valve controlled by the water heater controller, the automatic blow down device to dispose of scale formed in the water heater.

The water heater can include a gas fired heater with a modulated burner. The water heater can include an indirectly fired heat exchanger. The water heater can include an electric heater.

The water heating and treatment system can further include at least one chemical injector downstream of the hot water outlet of the water heater. The water heating and treatment system can include a hot temperature distribution water held to about a setpoint temperature by the mixing station, and a high temperature water distribution fluidly coupled to the outlet line of the water heater without active water temperature tempering. The water heating and treatment system can further include a one-way check valve at the hot water outlet of the water heater. The water heating and treatment system can further include a water heater sanitation loop connected to the hot water outflow line from the water heater including a sanitation loop pump to circulate hot water within the water heater, the water heater sanitation loop contained in the enclosure.

A water heater controller can cause an activation of the water heater sanitation loop and a water temperature of the water heater to increase momentarily to a sanitization temperature above 151° F. for one or more periods of at least two minutes in a sanitation loop mode, and wherein the single or multiple temperature regulating mixing station maintains the at least first temperature zone at about the first hot water temperature during operation of the sanitation loop mode.

The water heater controller can cause the activation of the water heater sanitation loop on a pre-determined schedule. The water heater controller can be communicatively coupled to at least one of: the UV sanitation lamp or the anti-scale device, and the water heater controller causes the activation of the water heater sanitation loop in response to a detection of at least one of: an anti-scale device failure indication or a sanitation lamp failure indication.

The cold water supply line can include a sediment filter.

A method for treating hot water to suppress pathogens and undesired bacterial content in a water system includes: providing a water heater, a cold water supply line to supply water to the water heater, the cold water supply line including an anti-scale device and a UV sanitation lamp, a mixing station to supply a temperature regulated heated water to one or multiple temperature zones, the mixing station fluidly coupled to the cold water supply line and to a hot water outflow line from the water heater, the mixing station to supply heated water to at least a first temperature zone at a first hot water temperature, and wherein the water heater, the anti-scale device, the UV sanitation lamp, and the mixing station are housed in a single enclosure having at least one transparent wall through which components can be viewed; and sanitizing a cold water before flowing or pumping the cold water to the water heater.

The method can further include providing a water heater sanitation loop connected to the hot water outflow line from the water heater including a sanitation loop pump to circulate hot water within the water heater, and sanitizing hot water of the water heater by operating the sanitation loop pump to circulate hot water within the water heater at an elevated temperature exceeding 151° F. (66° C.) and holding the elevated temperature in the water heater for at least 2 minutes as controlled by a water heater controller.

The step of sanitizing the hot water of the water heater by operating the water heater sanitation loop can include sanitizing the hot water of the water heater by operating the water heater sanitation loop on a periodic schedule. The step of sanitizing the hot water of the water heater by operating the water heater sanitation loop can include sanitizing the hot water of the water heater by operating the water heater sanitation loop in response to a fault alarm of the UV sanitation lamp or the anti-scale device.

The single enclosure can be provided with two of the transparent walls on opposite sides of the enclosure.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
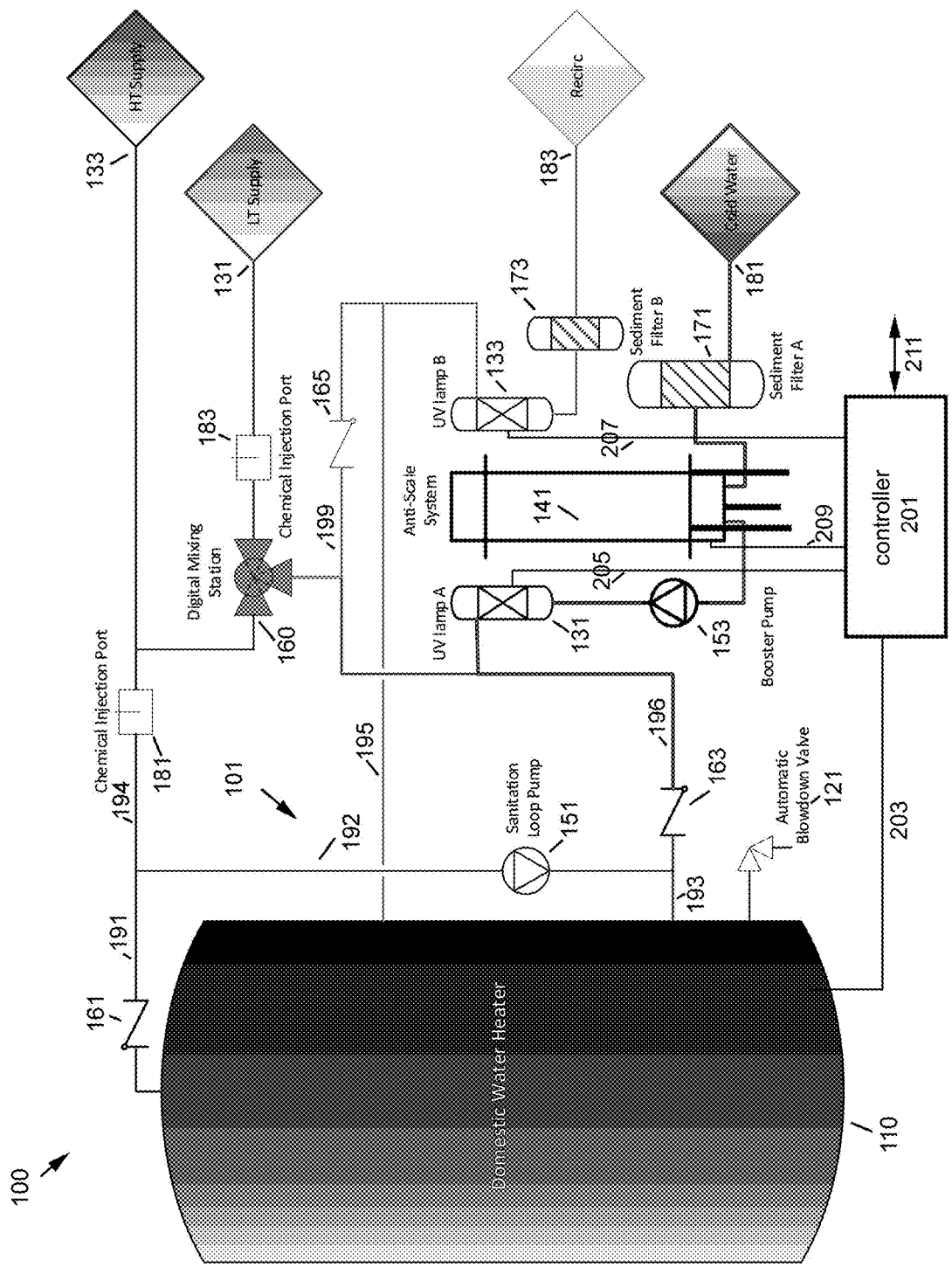
FIG. 1 is a schematic diagram showing an exemplary UV lamp and anti-scale water treatment water heater apparatus with sanitation loop according to the Application.

As described hereinabove, Legionnaires' disease from bacteria vaporized by evaporation from contaminated waters contaminated with *Legionella* germs is a well-known risk. Water heaters, including low volume instantaneous hot heater heaters, pose a significant risk if mitigation techniques are not in place. Associated cold water supply lines and hot water distribution systems are also at risk from contamination by pathogens such as *Legionella*, bacteria, and other undesirable microorganisms in a domestic water system.

One method to substantially eliminate *Legionella* and other pathogens is to heat the water to a sufficient temperature for a sufficient amount of time. One method of the prior art is to heat water in a system to about 50° C. to 60° C. for about an hour. However, such sanitation methods can also cause several problems. Bulk heating of the water in the system for sanitation reasons uses significantly more energy consumption than might otherwise be used. Also, the overall system or parts of the system may need to be removed from service during periods of elevated water temperatures used for system sanitation cycles. More recently, it has been found that further elevated water temperatures above 151° F. (66° C.) or higher can be effective in at least about two minute sanitation cycles. However, the energy cost compared normal lower hot water temperature should still be considered.

In recent years, sanitation by ultraviolet light has become more effective and more widely used. One advantage of UV sanitation is that the UV light can be operated continuously to treat water at one or more key point in domestic water system, such as, for example, in a cold water supply line, and also in a recirculating water return line.

Pathogens also accumulate in scale formation at various places in a domestic water system and heater. There have been efforts related to water hardness to mitigate scale formation to prevent failure and premature aging of various water system components. Scale buildup has also been found to be a gross vector for pathogens such as *Legionella*. Scale deposits provide a place where pathogens such as biofilms can adhere. There should also be efforts to mitigate scale formation to substantially prevent habitats for pathogens.

Anti-scale technologies, such as, for example, the OneFlow® anti-scale system, available from Watts Water Technologies, Inc. of North Andover, MA, can be employed as part of a pathogen suppression program. Anti-scale systems are distinguished from water softening devices and systems which are less or not effective at preventing scale buildup as part of a pathogen suppression or mitigation program. U.S. Pat. No. 9,879,120 B2, RESIN FOR PRECIPITATION OF MINERALS AND SALTS, METHODS OF MANUFACTURE AND USES THEREOF, assigned to Watts Water Technologies Inc., describes a method of producing a scale-control resin including an aqueous solution a cation-exchange resin and a weak-acid anion mineral or salt having a multivalent cation to allow ion exchange between the resin and the multivalent cation. The cation-exchange resin may be a weak-acid ion exchange resin. The method may further include adding a strong-acid salt having the same multivalent cation as the weak-acid anion mineral or salt to the aqueous solution. U.S. Patent Application Ser. No. 62/675, 898, QCM MEASUREMENT OF SCALE FORMATION, describes an exemplary water hardness mitigation or treatment evaluation system and method to evaluate the effectiveness of a water hardness mitigation or treatment evaluation system. Such exemplary techniques can be used to develop a fault indication for an anti-scale apparatus which can be received by a controller, such as the water heater controller, similar to a fault from a UV lamp device. The '120 patent and '898 application are incorporated herein by reference in their entirety for all purposes.

The addition of UV sanitation and/or water treatment products, such as the OneFlow® products in a domestic water system can provide sufficient treatment and pathogen mitigation alone. Because the energy consumption of such systems is relatively small (e.g. the power to run one or more UV lamps, or the power to monitor operation of a water treatment system which is negligible), domestic water sanitation can be now accomplished without the higher cost for the additional energy consumption used to raise the temperature of the water for sanitation by elevated water temperature. Exemplary suitable UV sanitation systems have been described in U.S. Pat. No. 9,738,547 B2, ULTRAVIOLET LIGHT SANITIZING ASSEMBLY WITH FLOW SWITCH AND KEYED LAMP, and U.S. Pat. No. 9,932, 245 B2, UV SANITIZING ASSEMBLIES WITH HIGH DOSE FEATURES AND METHODS FOR CONTROLLING THE SAME, both assigned to Watts Water Technologies, Inc. The '547 and '245 patents are incorporated herein by reference in their entirety for all purposes.

More advanced UV sanitation systems offer fault indications, typically via a local component controller which can also be in communication with a building controller, such as, for example, a system programmable logic controller and/or directly in communication with the water heater controller (e.g. a processor or microcomputer based controller). Faults, such as, a UV lamp failure can be displayed or alarmed locally and/or through a building controller system. Unfortunately, it is common for many such domestic water systems to continue to provide water to end users, including sinks and showers, sometimes for relatively long periods of time, before a defective UV lamp or other sanitation device is realized to be defective and/or there can be a delay until the failed device is repaired. Failure of timely maintenance and repair of water sanitization components might be caused by a lack of routine system and maintenance checks, a delay in calling for the repair, a lack of spare parts on hand, or carelessness by a building owner. After some period of time without device repair or replacement, the domestic water system can become vulnerable to contamination by pathogens, as if the failed remediation equipment had never been installed.

There is a need for a water heating and treatment, system and method which can effectively suppress pathogens, including undesired bacterial content, in a domestic water system with some degree of certainly, even where one or more sanitation device has failed or is otherwise inoperative.

It was realized that by incorporating advanced pathogen mitigation devices as part of a water heating system, that an elevated temperature water heater sanitation loop can be programmatically operated on schedule, and/or operated on a fault indication from a sanitation device, such as a UV lamp or anti-scale device communicatively coupled to a controller of the water heater. Where the controller of the water heater has such fault information, the controller can include a process to automatically invoke a backup or failsafe sanitation routine following notification of a fault by one or more of the system sanitation devices.

Scheduled operation of a sanitation loop: On a predetermined schedule, the controller of the water heater can command the water heater (e.g. as by modulating the burner heat output of a gas fired water heater, as controlled by the water heater controller) to an elevated temperature for a desired period of time as a scheduled backup or failsafe sanitation operation.

Operation of a sanitation loop in response to a fault detection: On notification from one or more sanitation devices that the sanitation device has failed (e.g. a failed UV lamp), the controller of the water heater can command the water heater (e.g. as by modulating the burner heat output of a gas fired water heater, as controlled by the water heater controller) to an elevated temperature for a desired period of time. For example, there can be scheduled at a predetermined interval or intervals, 2 minute temperature rises of the hot water in the water heater to above 151° F. The sanitation effectiveness of periods of elevated hot water temperature can be enhanced by a water flow through the water heater, such as a water flow caused by a close-in bypass loop which includes a sanitation pump.

In one exemplary embodiment, the water heater includes a sanitation bypass sanitation loop with a sanitation loop pump. Either on a pre-programmed schedule and/or following notice of a sanitation device failure from the failed device, the water heater controller runs a sanitation process, where the sanitation loop is activated (including activation of the sanitation loop pump) and the temperature of the water in the heater is raised by the water heater to an elevated temperature for an appropriate time, for that elevated temperature, to kill pathogens. For example, using currently best understood sanitation techniques, the water heater can increase the temperature in the water heater to above 151° F. in one or periodic cycles lasting at least two minutes. Such water heater cycles can be performed by any suitable number of times during a day and repeated as for as long as is needed until the fault indication from the sanitation device goes away or is otherwise reset. As described hereinabove, there can also be sanitation cycles run on a predetermined schedule, even in the absence of sanitation device fault indications, as a backup or failsafe mode of operation for a more certain pathogen suppression. An entire sanitation cycle, including heating the water to above 151° F. and at least 2 minutes of relatively high water velocity (high flow rate) through the sanitation loop at the elevated temperature above 151° F.

Some hot water distribution lines may be able to continue to operate normally without any additional manual or automatic operations during the times of elevated hot water temperature. For example, some high temperature water users, such as, for example, some industrial type washers and dishwashers can run normally even with periods of elevated hot water temperatures such as can result from operation of the sanitation loop (where there is no mixing valve in the hot water distribution line). Other hot water distribution systems cannot tolerate an elevated hot water supply at the sanitation temperature, such as, for example, hot water to building sinks and showers. However, water to those "low temperature" hot water distribution lines can be supplied through a mixing system, such as, for example a digital mixing system, where cold water is automatically injected into the distribution line to ensure that the desired hot water temperature, typically about 120° F. is provided, despite any short term operation of a sanitation loop at the water heater causing higher than normal water temperature of the hot water in the water heater as well as the hot water at the water heater outlet line.

There can also be either a single or a multiple mixing station which supplies heated water to one or multiple temperature zones. The single or multiple mixing station is fluidly coupled to the cold water supply line and to a hot water outflow line from the water heater. The single or multiple mixing station supplies heated water to at least a first temperature zone at a first hot water temperature.

FIG. 1 shows a schematic diagram of an exemplary UV lamp and anti-scale water treatment water heater apparatus with sanitation loop 100 for suppression of pathogens including undesired bacterial content in a domestic water system (i.e. mitigation of pathogens such as *Legionella* in potable water systems) according to the Application. Cold or cool water 181 enters UV lamp and anti-scale water treatment water heater apparatus with sanitation loop 100 from a source of potable cold water 181 (e.g. a municipal domestic water utility source as distributed within a building) passing through a sediment filter (A) 171, anti-scale system 141 and UV water treatment lamp (A) 131 to ensure that substantially no waterborne pathogens are introduced to the water heater 110 from the municipal supply. The anti-scale system 141 is placed before the UV lamp 131 to substantially prevent scale formation or build up in the UV lamp. The anti-scale system 141 also prevents scale formation in the water heater 110. Optional booster pump 153 can provide a desired water pressure and flow rate for the cold water inlet supply line. Cold water 181 is provided to the hot water 110 (of any suitable domestic water heater, form clarity of illustration, not shown in detail in FIG. 1) via cold water line 196, one way valve 163 (which prevents hot water from the sanitation loop from flowing into the cold water lines), and line 193 which doubles for cold water supply, and to provide the return line for the sanitation loop 101.

One suitable anti-scale system is the OneFlow® anti-scale system available from Watts Water Technologies, Inc. of North Andover, MA. Water heater 110 can be a part of a water heater device such as, for example, any suitable water heater available from PVi™ of Fort Worth, TX, or from AERCO International, Inc. of Blauvelt, NY.

Water is heated to the desired setpoint and delivered to an integral mixing valve such as a digital mixing station 160. Suitable digital mixing stations include, for example, the IntelliStation™ available from POWERS™ (Watts Water Technologies, Inc.) of North Andover, MA. Principles of mixing have been described, for example, in U.S. Pat. No. 9,122,284 B2, Electromechanical temperature regulation system for providing tempered mix water, assigned to PVI Industries Inc. (Watts Water Technologies, Inc.). Hot water from water heater 110 is provided to the mixing station 160 via one way valve 161, and hot water lines 191 and 194 to provide the "first temperature" hot water 131 supply. Digital mixing station 160 is used for tempering water to a controlled temperature hot water supply, shown in FIG. 1 as LT supply 131. Hot water is supplied directly to the high temperature water system, shown in FIG. 1 as HT supply 133.

Any suitable water heater 110 can be used. It is unimportant whether a source of heat, heats the water in the water heater directly (e.g. some types of electrical heating elements), or if there is a heat exchanger, such as, for example, where a hot combustion gas flows through tubes that run through a water heater to heat the water. It is also unimportant what type of fuel is used. While in commercial water heaters, gas burning burners are common, the same system and processes described by the Application can be implemented with electric, oil, direct, or indirect heat exchangers, including steam or non-potable boiler water heaters.

Exemplary suitable heat exchanger units include a plate and frame heat exchanger heater used with boiler water on one side and domestic water heater on the other side. The higher temperature boiler water heats the domestic water to the desired hot water temperature. Steam heating can also be used, such as where steam runs through pipe with water flowing around the pipe in a shell. For example, the water heater can include an indirectly fired heat exchanger, such as a plate and frame heat exchanger, a brazed plate heat exchanger, or a shell and tube heat exchanger. Or, the water heater can include an indirectly fired steam heated heat exchanger, such as a brazed plate heat exchanger, or a shell and tube heat exchanger.

Other suitable water heaters include gas fired water heaters, such as those with a modulated burner. Electrical elements, such as, for example, coiled electrical heating elements can also be used to more directly heat the water in an instantaneous type water heater. It is understood that water heaters as described hereinabove typically include any suitable water heater controller (e.g. controller 201, FIG. 1).

Controller 201 is typically, but not necessarily, the same as the controller of the water heater 110 via communication line 203. Controller 201 is optionally communicatively coupled to UV water treatment lamp (A) 131 via communication line 205, anti-scale system 141 via communication line 209, and/or UV water treatment lamp (B) 133 via communication line 207. Similarly, controller 201 can be optionally communicatively coupled via communication line 211 to any suitable communication lines to peripherals, such as, for example, one or more displays or indicators (not shown in FIG. 1) and/or any suitable wired or wireless connections (e.g. Bluetooth, WIFI, etc., to any other suitable computers or controllers. Communication lines 203, 205, 207, 209 and/or 211 can be any suitable wired or wireless connections of any suitable hardwired control wires, hardwired communication bus or protocol, any suitable wireless connection and/or any combination thereof.

Sediment filters 171, 173 can remove undesired particulate matter before it enters the parts of the UV lamp and anti-scale water treatment water heater apparatus with sanitation loop 100 at either the cold water inlet or the recirculation water inlet. Any suitable sediment filter can be used.

Recirculation water is water that has gone out to a building hot water distribution system, but that was not used at any of the fixtures, or devices and which can be returned via a UV lamp and anti-scale water treatment water heater apparatus with sanitation loop 100 as "unused" hot water. In the exemplary system of FIG. 1, building recirculation water is brought back to the UV lamp and anti-scale water treatment water heater apparatus with sanitation loop 100 via sediment filter (B) 173 and UV water treatment lamp (B) 133, to ensure that substantially no waterborne pathogens are introduced to the system from the building hot water distribution lines and fixtures. Recirculated hot water 183 is distributed directly back into the water heater via line 195 for reheating and reuse, and to the mixing valve 160 via one-way check valve 165 and line 199.

Chemical injection ports 181, 183 (e.g. for chlorine dioxide) can be optionally used to further treat the outgoing hot water from the water heater. Chemicals such as chlorine dioxide are preferably introduced downstream of the heat exchanger so that they do not deteriorate the heat exchanger structure.

Figure 2:
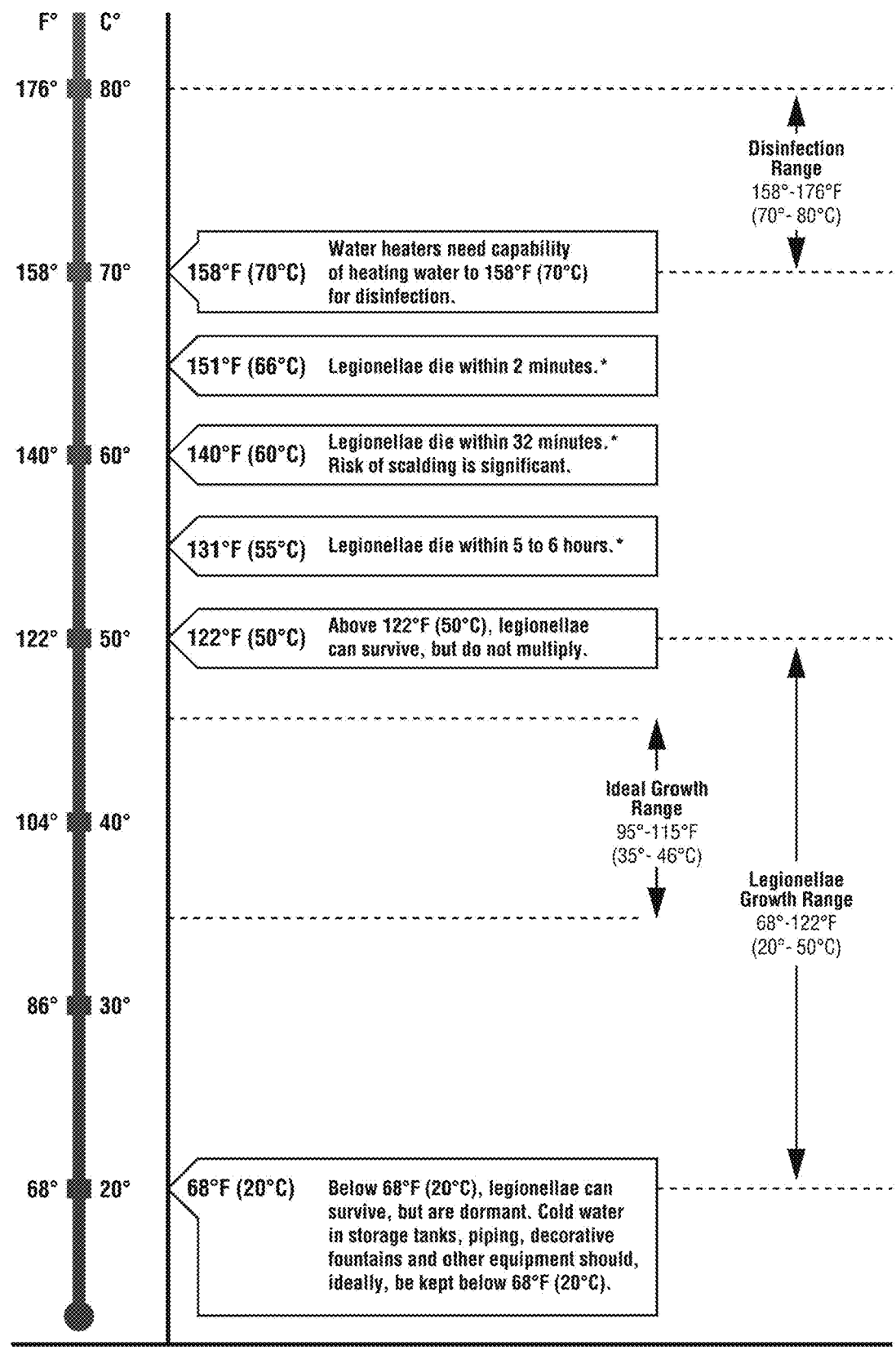
FIG. 2 is a diagram showing recommended sanitation temperatures and times.

FIG. 2 is a diagram showing recommended sanitation temperatures and times sanitation Loop Sequence of Operation. The Diagram shows how several *Legionella* species, including *Legionella pneumophila*, respond to water temperatures in a laboratory setting. In an actual hot-water system, legionellae may multiply at temperatures well above 122° F. because of scale, biofilm and other complexities (*Legionellae Control in Health Care Facilities: A Guide for Minimizing Risk*, Matthew Freije, HC Info, as reprinted in *Understanding Potential Water Heater Scald Hazards* A White Paper Developed by the ASSE International Scald Awareness Task Group, May 2013).

Sanitation loop—When enabled, the UV lamp and anti-scale water treatment water heater apparatus with sanitation loop 100 resets the setpoint temperature of the water heater from a normal operational setting (e.g. typically about 120° F. to 140° F.), up to about 160° F. As part of the sanitation or sanitation loop 101, circulating pump 151 pumps water from the supply connection 191 through pipe 192 to the cold inlet connection 193 and continues until the water within water heater 110 temperature exceeds above 151° F. (66° C.) and holds for at least 2 minutes, per the water treatment recommendations of FIG. 2.

Suitable water flow rates for the sanitation loop range as caused by the sanitation pump in the sanitation bypass loop are generally at least about the GPM flow rate of the water heater in normal operation, or higher. Note that a sanitation loop is distinct from bypass loops of the prior art which are used for temperature regulation and other applications, such as continuous water circulation or condensation reduction in the water heater. Such bypass loops use relatively small diameter pipes, and much lower flow rates, not suitable for the new sanitation loop described hereinabove.

Example

A water heater includes a sanitation loop as described hereinabove using a 2" pipe diameter and a ⅓ hp pump to achieve a sanitation loop flow rate of about 80 GPM. Typically, the pump and sanitation loop pipe should be large enough to support a flow greater than the normal flow of heated water from the water heater (i.e. as related to the heat capacity of the water heater).

When complete, the setpoint can be returned to the pre-sanitation loop normal operating temperature and the heated water will be delivered to the mixing valve 160, and where used, to the high temperature system water 133 supply. The sanitation loop function can be scheduled for periodic operation (e.g. at regular or irregular time intervals) and/or operated based on a maintenance alarm, such as, for example, a fault indication from a water quality or water treatment device, such as a UV lamp fault or an anti-scale fault indication.

Automatic Blowdown Sequence of Operation—In some embodiments, an auto-blowdown feature can automatically drain any sediment that may have settled to the bottom of the heater by operation of an automatic blow down valve 121. Once complete the drain valve can be closed and the unit placed back into its standard sequence of operation. An automatic blowdown sequence can be programmed to be performed on a regular or irregular schedule and/or on a more frequent operating schedule, such as, for example, in response to a fault condition, such as, for example, a fault indication from the anti-scale system. Such anti-scale system fault indications are being developed for commercialization, such as, for example, the QCM system described in the '898 application reference to hereinabove.

Controller—the water heater can include any suitable controller, typically a processor based controller. The controller can be based on any suitable embedded processor or embedded computer. The water heater control can monitor and report the status and faults of the UV fluency and Mixing Valve, as well as perform standard water heater operational functions.

Figure 3:
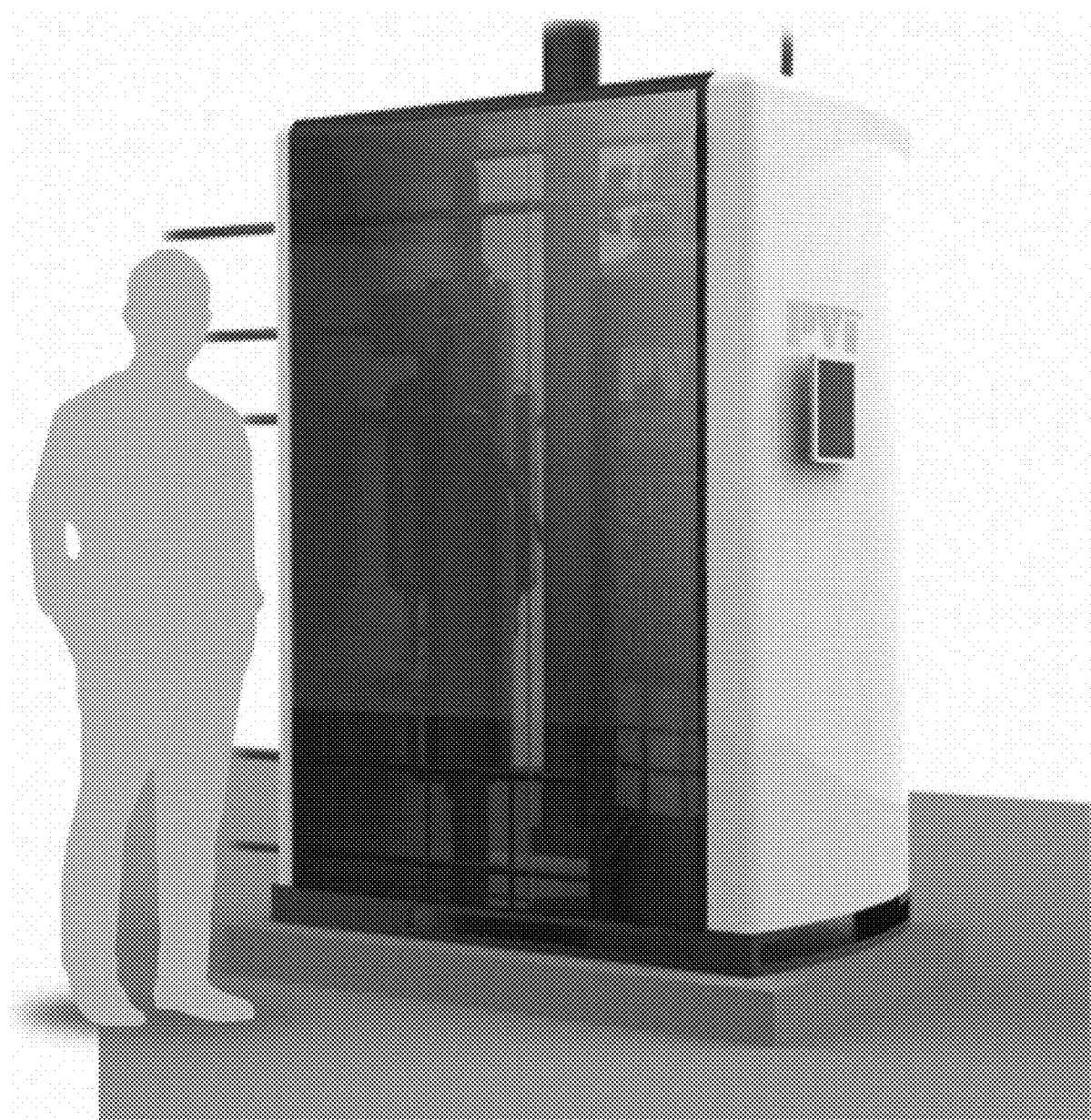
FIG. 3 shows a drawing of an exemplary self enclosed, single cabinet implementation of the apparatus of FIG. 1.

The UV lamp and anti-scale water treatment water heater apparatus with sanitation loop of FIG. 1 can be built into a single enclosure as a compact self enclosed apparatus. FIG. 3 shows a drawing of an exemplary self enclosed, single cabinet implementation of the apparatus of FIG. 1. The exemplary water heating and treatment system with UV lamp and anti-scale water treatment sanitation for suppression of pathogens and undesired bacterial content in a domestic water system of FIG. 3 shows the water heater, the anti-scale device, the UV sanitation lamp, the single or multiple mixing station and the water heater sanitation loop all housed in a single enclosure having at least one transparent wall through which the components can be viewed, such as by the person shown standing next to the housing in FIG. 3.

Applications of the UV lamp and anti-scale water treatment water heater apparatus with sanitation loop of FIG. 1 include domestic hot water installations for critical healthcare facilities such as hospitals, and in the hospitality areas, including, for example, restaurants, resorts, and hotels.

Instantaneous water heaters have relatively small volumes of heated water, and hot water tanks are no longer used or at least are less common in modern water heating applications and installations. However, those skilled in the art will recognize that the same techniques of a UV lamp and anti-scale water treatment water heater apparatus with sanitation loop as described by the Application, can be applied to hot water tanks of a hot water system. While present trends are towards water heaters that heat water on demand (e.g. instantaneous water heaters as used in the exemplary systems described hereinabove), those skilled in the art will also recognize that the same techniques of a UV lamp and anti-scale water treatment water heater apparatus with sanitation loop as described by the Application can also be applied to tank type water heaters.

Software or firmware of processors, controllers, and computers that can be used to implement a water heater, a digital mixing station, a UV lamp and an anti-scale water treatment water heater apparatus with sanitation loop of FIG. 1 can be provided on any suitable computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A water heating and treatment system comprising:
a water heater;
a hot water outflow line from said water heater;
a cold water supply line to supply water to said water heater, said cold water supply line comprising at least one of an anti-scale device, and an ultraviolet (UV) sanitation lamp;
a mixing station to supply a temperature regulated heated water to one or multiple temperature zones, said mixing station fluidly coupled to said cold water supply line and to the hot water outflow line from said water heater, said mixing station to supply heated water to at least a first temperature zone at a first hot water temperature;
wherein said water heater, said anti-scale device, said ultraviolet (UV) sanitation lamp, and said mixing station are contained in a single enclosure having at least one transparent wall through which components can be viewed.

2. The water heating and treatment system of claim 1, wherein said single enclosure includes two of the at least one transparent wall on opposite sides of the single enclosure.

3. The water heating and treatment system of claim 1, further comprising a hot water recirculation line contained in said single enclosure.

4. The water heating and treatment system of claim 3, further comprising a one-way check valve disposed in said hot water recirculation line.

5. The water heating and treatment system of claim 3, wherein said hot water recirculation line comprises a sediment filter.

6. The water heating and treatment system of claim 3, wherein said hot water recirculation line comprises an additional UV lamp sanitation device.

7. The water heating and treatment system of claim 3, wherein said hot water recirculation line comprises an additional anti-scale device.

8. The water heating and treatment system of claim 1, wherein said water heater comprises an automatic blow down device including a blow down valve controlled by a water heater controller, said automatic blow down device to dispose of scale formed in said water heater.

9. The water heating and treatment system of claim 1, wherein said water heater comprises a gas fired heater with a modulated burner.

10. The water heating and treatment system of claim 1, wherein said water heater comprises an indirectly fired heat exchanger.

11. The water heating and treatment system of claim 1, wherein said water heater comprises an electric heater.

12. The water heating and treatment system of claim 1, further comprising at least one chemical injector downstream of said hot water outflow line of said water heater.

13. The water heating and treatment system of claim 1, comprising hot temperature distribution water held to about a setpoint temperature by said mixing station, and a high temperature distribution water fluidly coupled to the hot water outflow line of said water heater without active water temperature tempering.

14. The water heating and treatment system of claim 1, further comprising a one-way check valve at said hot water outflow line of said water heater.

15. The water heating and treatment system of claim 1, further comprising a water heater sanitation loop connected to the hot water outflow line from said water heater including a sanitation loop pump to circulate hot water within said water heater, said water heater sanitation loop contained in said single enclosure.

16. The water heating and treatment system of claim 15, wherein a water heater controller causes an activation of said water heater sanitation loop and a water temperature of said water heater to increase momentarily to a sanitization temperature above 151° F. for one or more periods of at least two minutes in a sanitation loop mode, and wherein said mixing station maintains said at least first temperature zone at about said first hot water temperature during operation of said sanitation loop mode.

17. The water heating and treatment system of claim 16, wherein said water heater controller causes said activation of said water heater sanitation loop on a pre-determined schedule.

18. The water heating and treatment system of claim 16, wherein said water heater controller is communicatively coupled to at least one of: said UV sanitation lamp or said anti-scale device, and said water heater controller causes said activation of said water heater sanitation loop in response to a detection of at least one of: an anti-scale device failure indication or a sanitation lamp failure indication.

19. The water heating and treatment system of claim 1, wherein said cold water supply line comprises a sediment filter.

20. A method for treating hot water to suppress pathogens and undesired bacterial content in a water system comprising:

providing a water heater, a cold water supply line to supply water to said water heater, said cold water supply line comprising an anti-scale device and an ultraviolet (UV) sanitation lamp, a mixing station to supply a temperature regulated heated water to one or multiple temperature zones, said mixing station fluidly coupled to said cold water supply line and to a hot water outflow line from said water heater, said mixing station to supply heated water to at least a first temperature zone at a first hot water temperature, and wherein said water heater, said anti-scale device, said ultraviolet (UV) sanitation lamp and said mixing station are housed in a single enclosure having at least one transparent wall through which components can be viewed; and sanitizing a cold water before flowing or pumping said cold water to said water heater.

21. The method of claim 20, further providing a water heater sanitation loop connected to the hot water outflow line from said water heater including a sanitation loop pump to circulate the hot water within said water heater, and sanitizing the hot water of said water heater by operating said sanitation loop pump to circulate the hot water within said water heater at an elevated temperature exceeding 151° F. (66° C.) and holding said elevated temperature in said water heater for at least 2 minutes as controlled by a water heater controller.

22. The method of claim 21, wherein said step of sanitizing the hot water of said water heater by operating said sanitation loop pump comprises sanitizing the hot water of said water heater by operating said sanitation loop pump on a periodic schedule.

23. The method of claim 21, wherein said step of sanitizing the hot water of said water heater by operating said sanitation loop pump comprises sanitizing the hot water of said water heater by operating said sanitation loop pump in response to a fault alarm of said UV sanitation lamp or said anti-scale device.

24. The method of claim 20, wherein said single enclosure is provided with two of the at least one transparent wall on opposite sides of the single enclosure.

* * * * *